US009237550B1

(12) United States Patent
Rai et al.

(10) Patent No.: US 9,237,550 B1
(45) Date of Patent: Jan. 12, 2016

(54) METHOD AND SYSTEM FOR MANAGING PAGING OF A WIRELESS COMMUNICATION DEVICE

(71) Applicant: Sprint Spectrum L.P., Overland Park, KS (US)

(72) Inventors: Deveshkumar N. Rai, Overland Park, KS (US); Maulik K. Shah, Overland Park, KS (US); Jasinder P. Singh, Olathe, KS (US); Naresh Madineni, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 382 days.

(21) Appl. No.: 13/783,730

(22) Filed: Mar. 4, 2013

(51) Int. Cl.
*H04W 68/00* (2009.01)
*H04W 68/02* (2009.01)

(52) U.S. Cl.
CPC .................................... *H04W 68/02* (2013.01)

(58) Field of Classification Search
CPC ...................................................... H04W 68/02
See application file for complete search history.

(56) References Cited

U.S. PATENT DOCUMENTS

| 5,940,756 | A | * | 8/1999 | Sibecas et al. | 455/426.1 |
| 6,731,740 | B1 | * | 5/2004 | Choudhury et al. | 379/221.03 |
| 8,000,684 | B1 | * | 8/2011 | Bhan et al. | 455/412.2 |
| 2006/0052117 | A1 | * | 3/2006 | Katsube et al. | 455/458 |
| 2011/0280221 | A1 | * | 11/2011 | Chin et al. | 370/335 |
| 2012/0039167 | A1 | * | 2/2012 | Swaminathan et al. | 370/225 |

* cited by examiner

*Primary Examiner* — Keith Fang

(57) ABSTRACT

A radio access network (RAN) may be configured to manage paging of a wireless communication device (WCD). The RAN may initiate a paging process to page the WCD, and the paging process may comprise the RAN transmitting to the WCD a defined sequence of page attempts until the RAN receives a page response from the WCD or the RAN has transmitted a final page attempt of the sequence. After the RAN has transmitted at least one page attempt of the sequence but before the final page attempt of the sequence has been transmitted, the RAN may determine that the RAN has not received the page response from the WCD, and that the WCD is currently engaged in active data communication, and the RAN may responsively discontinue the paging process.

17 Claims, 5 Drawing Sheets

METHOD AND SYSTEM FOR MANAGING PAGING OF A WIRELESS COMMUNICATION DEVICE

BACKGROUND

Unless otherwise indicated herein, the materials described in this section are not prior art to the claims and are not admitted to be prior art by inclusion in this section.

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations (e.g., macro network cell towers and/or femtocells), each of which may radiate to define wireless coverage areas, such as cells and cell sectors, in which WCDs can operate. Further, the RAN may include one or more controllers, which may be integrated with or otherwise in communication with the base stations. The controller may include or be in communication with a switch or gateway that provides connectivity with a transport network such as the PSTN or the Internet. With this or other arrangements, a cell phone, personal digital assistant, wirelessly-equipped computer, or any other WCD that is positioned within coverage of the RAN can then communicate with a base station and thereby communicate via the base station with various remote network entities or with other WCDs served by the base station.

In general, a cellular wireless system may operate in accordance with a particular air interface protocol or "radio access technology." Examples of existing air interface protocols include Code Division Multiple Access (CDMA) (e.g., 1xRTT and 1xEV-DO), Long-Term Evolution (LTE) (e.g., FDD LTE and TDD LTE), WiMAX, iDEN, TDMA, AMPS, GSM, GPRS, UMTS, EDGE, MMDS, Wi-Fi, and BLUETOOTH. Each protocol may define its own procedures for initiation of calls, handoff between coverage areas, and functions related to air interface communication.

In accordance with the air interface protocol, each coverage area may operate on one or more carrier frequencies and may define a number of air interface channels for carrying information between the base station and served WCDs. These channels may be defined in various ways, such as through frequency division multiplexing, time division multiplexing, and/or code-division multiplexing (e.g., spread-spectrum modulation), for instance.

By way of example, each coverage area may define a "forward-link" (or downlink) control channel or other resource on which a base station may transmit control messages such as system information messages or page messages to WCDs. Each coverage area may also define a "reverse-link" (or uplink) control channel or other resource on which WCDs may transmit control messages such as registration requests and call origination requests (e.g., voice calls, data sessions, and/or other "calls") to the base station. Each coverage area may then define one or more traffic channels (e.g., on the forward-link) for carrying communication traffic such as voice data or other data between the base station and the WCD.

When a WCD first powers on or enters into coverage of the network, the WCD may detect presence of coverage and may register with the network by transmitting a registration request or attach request to a base station. At that point, the WCD may operate in an idle mode in which the WCD periodically reads a forward-link control channel to receive overhead information from the network and to check for any page messages destined to the WCD. In the idle mode, the WCD may have no assigned traffic channel resources on which to receive incoming communication traffic from the network.

When the network has a communication such a voice call or other traffic to provide to a WCD that is registered with the network but is operating in the idle mode, the network may page the WCD in an effort to then facilitate assigning traffic channel resources to the WCD. In particular, the network may transmit on the forward-link a page message addressed to the WCD. Assuming the WCD receives this page message, the WCD may then transmit to the network a page response message on the reverse-link. Upon receipt of the page response message, the network may then assign traffic channel resources to the WCD, for use to carry the communication.

Once a RAN transmits to a WCD a page message, such as voice call setup request, the RAN may wait a defined period of time for the WCD to respond. If the WCD does not respond to the page message within that period of time, the network may then re-page the WCD, possibly increasing page message transmission power and/or broadening the coverage area scope of the page. Further, the network may repeat this re-paging process a defined number of times before concluding that the paging effort failed. Upon concluding that the paging effort failed, the network may then abort the effort to provide the communication (e.g., voice, data, etc.) to the WCD.

OVERVIEW

In some scenarios, a WCD may be arranged to not respond to page messages that the WCD receives when the WCD has a data connection. In these scenarios, a RAN may not receive responses to the page messages that it transmits to the WCD. By way of example, the WCD may include a feature that may enable the WCD to set itself (possibly before, during, or after establishing the data connection) to operate in a mode in which it will not respond to page messages while it is engaged in a data communication session. As such, when the WCD is operating in the mode, the RAN may not receive page responses from the WCD. Such a mode may be referred to herein as Data Dedicated Transmission Mode (DDTM) "ON" mode (or "DDTM ON"), and DDTM may also be switched "OFF" by the WCD. Other examples are also possible.

In line with the discussion above, a RAN may initiate a paging process and page/re-page a WCD without being aware of whether and when the WCD is engaged in a data communication session. If the WCD is engaged in the data communication session, the WCD may disregard the transmitted pages without indicating to the RAN that the pages have been disregarded. As a result of the RAN continuously paging the WCD without receiving a response from the WCD, a paging load on one or more forward-link paging channels may increase, which may have a negative impact on the network. For example, since each page message may be transmitted by the WCD's serving base station at a particular power level, the excessive paging may deplete too much of the maximum power allocated to the serving base station. Consequently, power levels of transmissions made from the serving base station to other WCDs in the coverage area may decrease below a threshold power level at which the other WCDs can process the forward-link signals. Further, the transmissions of these page messages, as with other transmissions over the air interface, may add to the overall noise perceived by WCDs in the coverage area.

As such, it may be advantageous for the RAN to monitor paging of a WCD (e.g., page messages sent to a given WCD and page responses received from the given WCD) and to prematurely discontinue the paging responsive to making a determination that the WCD has a data connection, so as to help avoid excessive paging. Accordingly, disclosed are methods and systems for managing the paging of a WCD.

One embodiment takes the form of a method carried out by a RAN that provides wireless communication service to at least one WCD. The method involves the RAN initiating a paging process to page a WCD. The paging process may comprise the RAN transmitting to the WCD a defined sequence of page attempts until the RAN receives a page response from the WCD or until the RAN has transmitted a final page attempt of the sequence. The method then involves, after the RAN has transmitted at least one page attempt of the sequence but before the RAN has transmitted the final page attempt of the sequence, (a) the RAN determining (i) that the RAN has not received the page response from the WCD and (ii) that the WCD is currently engaged in active data communication, and (b) responsive to the determining, the RAN discontinuing the paging process.

Another embodiment takes the form of a non-transitory computer-readable medium having stored thereon program instructions executable by a processing unit of a RAN to cause the RAN to perform functions comprising the method described above.

Yet another embodiment takes the form of a RAN that includes at least one wireless communication interface, at least one processor, a data storage, and program instructions stored in the data storage executable by the at least one processor for performing functions. The functions include initiating a paging process to page a WCD, wherein the paging process comprises the RAN transmitting to the WCD a defined sequence of page attempts until the RAN receives a page response from the WCD or the RAN has transmitted a final page attempt of the sequence. The functions further include, after the RAN has transmitted at least one page attempt of the sequence but before the RAN has transmitted the final page attempt of the sequence, (a) determining (i) that the RAN has not received the page response from the WCD and (ii) that the WCD is currently has a wireless data connection, and (b) responsive to the determining, the RAN discontinuing the paging process.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

I. Introduction

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Network Arrangement

Figure 1:
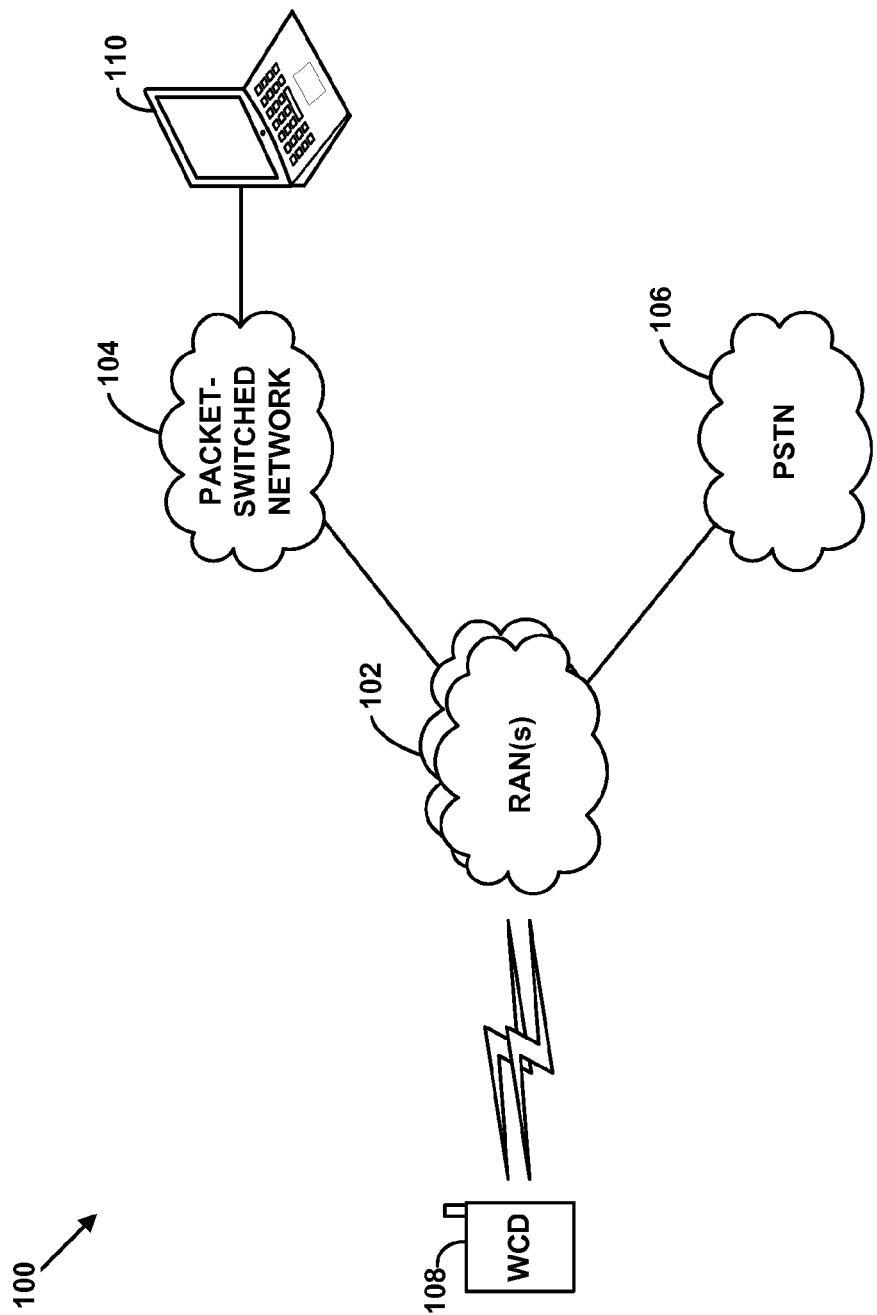
FIG. 1 is a simplified block diagram of a network arrangement in which the present method can be implemented.

FIG. 1 depicts a network arrangement 100 that includes at least one RAN 102, a packet-switched network (PSN) 104, and a PSTN 106. The at least one RAN 102 communicates with the PSN 104 via a communication link and with PSTN 106 via another communication link. Either or both of these links may include one or more wired and/or wireless interfaces. Each respective RAN of the at least one RAN 102 may function to provide WCDs with air interface coverage and connectivity with one or more transport networks such as the PSTN and the Internet. For instance, the network arrangement 100 may include a WCD 108 that communicates with the at least one RAN 102 over at least one air interface.

The network arrangement 100 may further include a computing device 110 that communicates with the PSN 104. In practice with this arrangement 100, the WCD 108 may engage in packet-data communication with the computing device 110 through the PSN 104, and such communication may be facilitated by the at least one RAN 102 in accordance with a particular air interface protocol, such as CDMA or LTE, for instance.

When the WCD 108 seeks to engage in packet-data communication, perhaps automatically upon registering in a coverage area of the RAN 102, the WCD 108 may engage in signaling to acquire an active wireless packet-data connection with its serving base station or other entity of the RAN 102. For instance, the WCD 108 may transmit an access request message to the RAN 102, and the RAN 102 may responsively direct the WCD's serving base station to assign an air interface traffic channel or other radio link layer connection for use by the WCD 108. Further, the WCD 108 may negotiate with the RAN 102 to establish a data link layer connection, and the RAN 102 may arrange for assignment of a network address, such as an IP address to the WCD 108. Once the WCD 108 has an active data connection, the WCD 108 may then use the network address to communicate via the RAN 102 with other entities on the packet-switched network so as to engage in a data communication session (or "data session"). Types of data communication sessions may include, for instance, voice over Internet Protocol (VoIP) calls (e.g., push-to-talk (PTT) and push-to-view (PTV) communication), file transfer protocol (FTP) sessions, and web browsing sessions, among others.

In scenarios such as those just described, a WCD may have an active data connection and also be engaged in a data communication session. It should be understood, however, that in other scenarios, a WCD may have an active data connection at a given moment without being engaged in a data communication session at that given moment. As such, for purposes of this description, scenarios in which a WCD may have an active data connection and/or be engaged in a data communication session may be referred to herein as scenarios in which the WCD is engaged in "active data communication."

While engaged in a data communication session, the WCD 108 may receive from a RAN 102 one or more page messages (e.g., a sequence of page messages) representative of a request to establish a voice call. In some scenarios, the WCD 108 may accept the request, suspending or otherwise interrupting its current data connection or data communication session and sending a page response to the RAN 102 so as to establish and engage in the voice call. Further, when the voice call is established, the data communication session may become inactive for the duration of the voice call. For instance, the RAN 102 may transition the WCD 108 from an active state to a dormant or idle state until the voice call is terminated. In the dormant state or idle, the WCD 108 may have an assigned network address but may not have a radio link over which data to that address can be sent.

Alternatively, in other scenarios, the WCD 108 may be arranged to not respond to any of the page messages received from the RAN 102 when the WCD 108 is engaged in the data communication session, so as to prevent an interruption of the data session. For instance, as noted above, the WCD 108 may be operating in DDTM ON mode. As such, the RAN 102 may continue to transmit page messages while the WCD 108 continues to disregard the page messages. Further, the RAN 102 may continue to transmit page messages to the WCD 108 for a defined period of time, or may transmit a defined number of page messages, before concluding that the paging effort has failed. Throughout the defined period of time, or until the defined number of page messages is reached, the RAN 102 may transmit (and possibly re-transmit) these page messages in sequence with varying intervals of time between each subsequent page message.

In line with the discussion above, and in network arrangements such as the arrangement 100 of FIG. 1, the RAN 102 may use certain air interface timeslots to carry page messages throughout a sequence of page message attempts. For example, the forward-link paging channel may be divided into a sequence of timeslots that may be grouped into repeated cycles, and certain timeslots in each cycle may be designated as paging timeslots or "paging occasions" in which the RAN 102 (e.g., a paging controller or base station) may transmit page messages to served WCDs.

In practice, the RAN 102 may transmit page messages destined to a particular WCD 108 in a particular one of the paging timeslots selected based on an algorithmic hashing process keyed to the WCD's identifier (e.g., a serial number of the WCD), and the WCD 108 may thus read that particular timeslot per cycle to obtain any such page messages. Both a RAN 102 and a WCD 108 may apply the algorithmic hashing process so that the RAN 102 can transmit a page message to the WCD 108 in the appropriate timeslot and the WCD 108 can read that particular timeslot to receive the transmitted page message.

In accordance with the present method, a RAN may initiate a paging process to page a target WCD. The RAN may then prematurely discontinue the paging process (e.g., before the process ends) in response to determining that the target WCD has an active data connection and/or that the target WCD is engaged in a data communication session (i.e., engaged in "active data communication," as noted above). In general, a paging process, such as a sequence of page attempts (i.e., page messages) as described above, may start with a first page message attempt, include a predefined number of page message attempts following the first page attempt, and end with a final page message attempt.

In practice, the RAN 102 (e.g., a paging controller) may begin transmitting a sequence of page attempts to a WCD 108, starting with a first page attempt. Sometime after the RAN 102 has begun the sequence of attempts and before the RAN 102 transmits the final page attempt of the sequence, the RAN 102 may determine that the WCD 108 has not yet responded to the attempts. For example, the RAN 102 may determine that it has not received a page response from the WCD 108 within a threshold period of time since the RAN 102 began transmitting the sequence of paging attempts. As another example, the RAN 102 may determine that it has transmitted a threshold number of page attempts without yet receiving a page response from the WCD 108. Other examples are also possible.

The RAN 102 may also make a determination, possibly after determining that the WCD 108 has not yet responded to the attempts, that the WCD 108 is currently engaged in active data communication. For instance, the RAN 102 may query another RAN (or an entity thereof, such as a gateway) that may be aware of the active data communication, such as a RAN that may be serving the WCD 108 with the active data connection or otherwise facilitating the active data communication. Further, in response to the RAN 102 determining that the WCD 108 is currently engaged in the active data communication, the RAN 102 may discontinue the sequence of attempts. In practice, for example, the RAN 102 may discontinue the sequence and, if the RAN 102 later determines that the WCD 108 is no longer engaged in the active data communication, the RAN 102 may reinitiate the sequence of attempts (e.g., start from the beginning of the sequence). In another example, the RAN 102 may pause the sequence of attempts for a predetermined duration of time longer than an interval of time that the RAN 102 would normally wait between the RAN's 102 transmission of page attempts of the sequence (e.g., between paging occasions).

Figure 2:
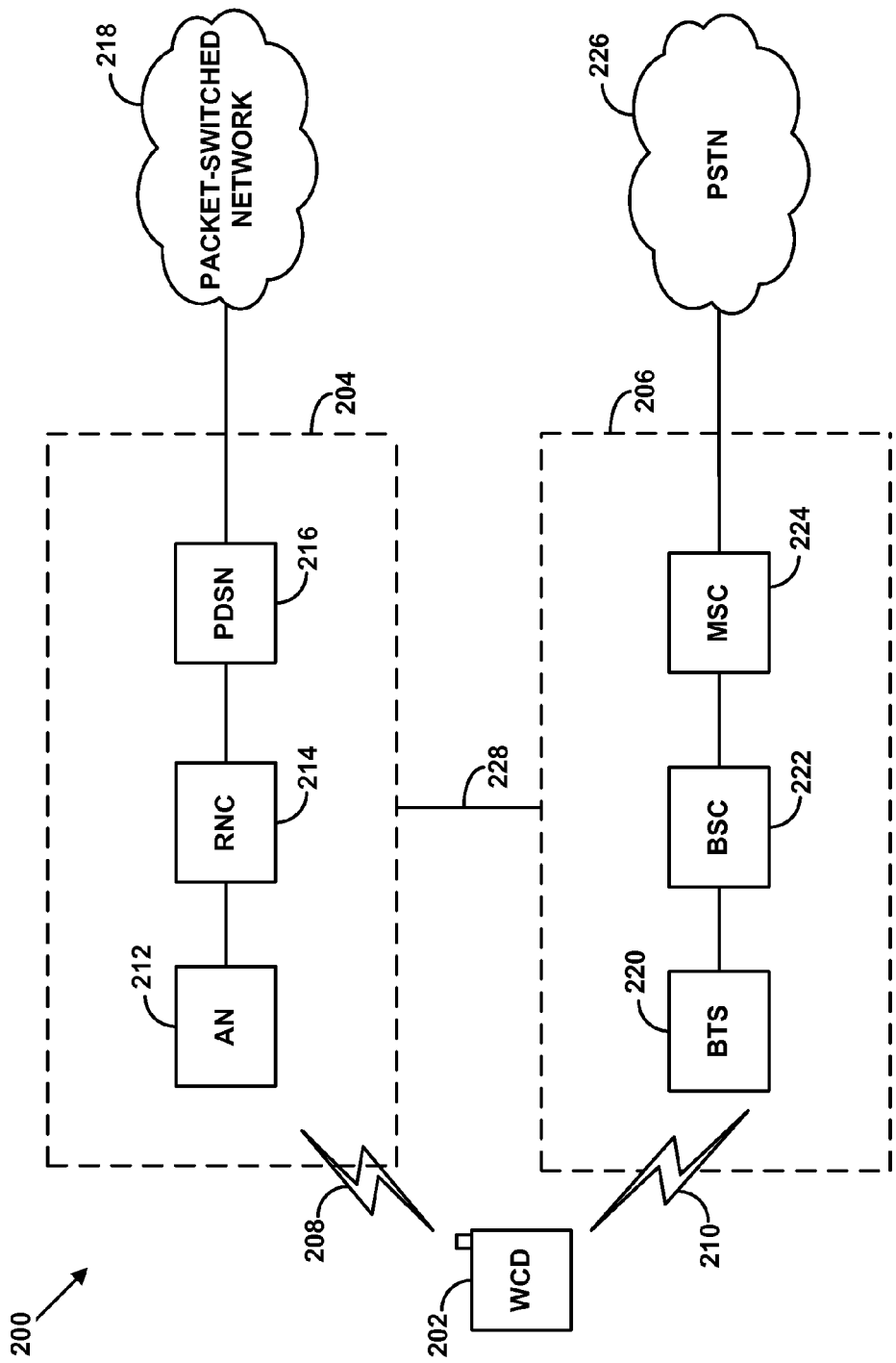
FIG. 2 is a simplified block diagram of a more specific network arrangement in which the present method can be implemented.

FIG. 2 is next a more specific block diagram depicting an example network arrangement 200 like the network arrangement shown in FIG. 1. In general, a WCD 202 may be arranged to communicate with a first RAN 204 over a first air interface 208, and may further be arranged to communicate with a second RAN 206 over a second air interface 210. In the arrangement 200 of FIG. 2, for instance, the first RAN 204 is a 1xEV-DO CDMA network that may serve WCDs with wireless packet-data communication service (e.g., VoIP and other packet-based real-time media service), and the second RAN 206 is a 1xRTT CDMA network that may serve WCDs with voice call service. However, in some scenarios, the 1xRTT CDMA network 206 may provide packet-data communication service and/or other types of service in addition to voice call service. One or more of these networks could take other forms as well, using other protocols such as LTE, GSM, or others now known or later developed. It should be understood that in some embodiments, these networks may be implemented in the same or overlapping geographic location and may be integrated. It should also be understood that other network arrangements are possible as well.

The 1xEV-DO CDMA network 204 in this arrangement 200 is shown including a representative base station known as an access node (AN) 208, which includes an antenna structure and associated equipment for communicating over the first air interface 208 with the WCD 202 and other WCDs. The 1xEV-DO network 204 may also include a radio network controller (RNC) 214, which may be communicatively linked to or integrated with the access node 208 in order to control aspects of the access node 208. The 1xEV-DO network 204 may further include a packet-data serving node (PDSN) 216 linked to the RNC 214, which may provide connectivity with the PSN 218, such as the Internet and/or a wireless carrier's private core packet-network. Through the entities shown in the 1xEV-DO network 204 of FIG. 2, as well as through other entities not shown, the WCD 202 may acquire an active data connection, and may then engage in data communication on the PSN 218.

As noted above, in order for the WCD 202 to engage in the data communication (e.g., upon registering in a coverage area served by the 1xEV-DO network 204), the WCD 202 may engage in signaling to acquire a data connection. For instance, the WCD 202 may transmit an access request message to the RNC 214, and the RNC 214 may responsively direct the access node 208 to assign an air interface traffic channel or other radio link connection for use by the WCD 202. Further, the RNC 214 may signal with a gateway, such as the PDSN 216, which may negotiate with the WCD 202 to establish a data link layer connection and may further arrange for assignment of a network address, such as an IP address to the WCD 202. The WCD 202 may then use the network address to communicate via the 1xEV-DO network 204 with other entities on the PSN 218.

The 1xRTT CDMA network 206, on the other hand, is shown including a representative base station known as a base transceiver station (BTS) 220, which includes an antenna structure and associated equipment for communicating over the second air interface 210 with the WCD 202 and other WCDs. The 1xRTT network 206 may also include a base station controller (BSC) 222, which may be communicatively linked to or integrated with the BTS 220 in order to control aspects of the BTS 220. The 1xRTT network 206 may further include a mobile switching center (MSC) 224, which may function to manage paging over the air interface 210 (e.g., control the paging process) and to provide connectivity with the PSTN 226. Alternatively, in some scenarios, the BTS 220 or BSC 222 could function as a paging controller of the 1xRTT network 206 instead of the MSC 224.

In practice, with this 1xRTT CDMA network arrangement, the WCD 202 may be registered with and idling in coverage of the BTS 220, and the MSC 224 may receive a signal indicative of an incoming voice call to be connected to the WCD 202. The MSC 224 may then page the WCD 202 (via the BTS 220), applying a paging process such as a sequence of page messages as described above. For instance, the MSC 224 may transmit a page message of the sequence over the air interface 210 to the WCD 202 in a particular timeslot that the WCD 202 is arranged to monitor. After the MSC 224 transmits the page message, the MSC 224 may wait a defined page-response interval of time and, absent receipt of a page response from the WCD 202, the MSC 224 may then transmit a next page message in a next timeslot. After a defined number of attempts (e.g., three attempts) with no response, the MSC 224 may then conclude that the paging process failed and the MSC 224 may responsively connect the incoming call to a voice mail system of the WCD 202.

The network arrangement 200 of FIG. 2 may support communication between the networks. As such, the network arrangement 200 includes a communication link 228 arranged to provide connectivity between the 1xEV-DO RAN 204 and the 1xRTT RAN 206. The communication link 228 is representative of any or all communication links (e.g., wired and/or wireless) between entities of the two networks. For example, with regard to the entities shown in FIG. 2, the communication link 228 may include a communication link between the RNC 214 and the BSC 220, between the access node 212 and the BTS 220, between the RNC 214 and the MSC 224, and so on. Further, the communication link 228 may include communication links between entities not shown in FIG. 2 that may be included in the respective networks.

With the network arrangement 200 shown, the WCD 202 may engage in active data communication (e.g., a data communication session) facilitated by the 1xEV-DO network 204. As noted above, after obtaining a radio link layer connection with the 1xEV-DO network 204, the WCD 202 may negotiate with the 1xEV-DO network 204 (e.g., the PDSN 216) to establish a data link layer connection and the 1xEV-DO network 204 may arrange for assignment of a network address, such as an IP address to the WCD 202. Once the WCD 202 has an active data connection, the WCD 202 may then use the IP address to communicate via the 1xEV-DO network 204 with other entities on the PSN 218 so as to engage in a data communication session.

While the WCD 202 is engaged in the active data communication, the 1xRTT network 206 may receive a signal indicative of an incoming voice call to the WCD 202 and may thus initiate a paging process (such as the sequence of page messages described above) to page the WCD 202. Further, when the WCD 202 engages in the active data communication, the WCD 202 may set itself to operate in DDTM ON mode, and the 1xRTT network 206 may not detect or be informed that the WCD 202 is operating in DDTM ON mode.

After the 1xRTT network 206 transmits at least a first page message and before the 1xRTT network 206 transmits a final page message of the sequence of page messages, the 1xRTT network 206 may determine that it has not received a page response from the WCD 202 within a defined period of time since the paging process was initiated by the 1xRTT network 206. In response, the 1xRTT network 206 (or an entity thereof) may then query an entity of the 1xEV-DO network 204, such as the RNC 214 and/or the PDSN 216, over the communication link 228 in order to determine if the WCD 202 is engaged in active data communication, or if the WCD has an active data connection. To facilitate this, the RNC 214 (or other entity) may have stored, for example, a DDTM ON flag received from the WCD 202 indicating that the WCD 202 is currently engaged in active data communication and that the WCD 202 will disregard all page messages that it receives. As another example, the RNC 214 and/or PDSN 216 may have stored an identifier of the WCD 202, such as a serial number or IP address of the WCD 202, when the WCD 202 first engaged in the active data communication.

Further, one or more entities of the 1xEV-DO network 204 and/or of the PSN 218 through which data packets are routed may be enabled to perform deep packet inspection (DPI) to facilitate a determination that the WCD 202 is engaged in active data communication. For example, the DPI may indicate that the WCD 202 is currently sending and/or receiving packet data. As another example, the DPI may indicate that the WCD 202 is currently sending and/or receiving session initiation messages, such as session initiation protocol (SIP) messages, in order to set up a data communication session. As yet another example, the DPI may determine information such as a session ID of the WCD's 202 data communication session to which the inspected data packets belong, the IP address of the WCD 202, and/or a serial number of the WCD 202 (or other such identifier). In these examples, the DPI may indicate to the 1xRTT network 206 that the WCD 202 is engaged in an active data communication session until/unless the DPI then indicates that the data session has been terminated. As such, an entity of the 1xRTT network 206 may query one or more DPI-enabled entities of the 1xEV-DO network 204 and/or the PSN 218 in order to determine that the WCD 202 is engaged in active data communication.

It should be understood, however, that the 1xRTT network 206 may determine that the WCD 202 is engaged in active data communication without querying the 1xEV-DO network 204. For instance, the 1xEV-DO network 204 (or an entity thereof) may push out to the 1xRTT network 206 an indicator (e.g., a DDTM ON flag) that the WCD 202 is engaged in active data communication and the 1xRTT network 206 (e.g., the MSC 224) may refer to the indicator. Other push/pull communications between the networks are also possible.

In response to the 1xRTT network 206 determining (i) that the WCD 202 has not yet responded to any page messages of the sequence, and (ii) that the WCD 202 is currently engaged in active data communication, the 1xRTT network 206 may discontinue the paging process, perhaps until the 1xRTT network 206 determines that the WCD 202 is no longer engaged in active data communication. In response to the 1xRTT network 206 determining that the WCD 202 is no longer engaged in the active data communication, the 1 xRTT network 206 may reinitiate the paging process.

In some scenarios, the 1xRTT network 206 may transmit the sequence of page messages at a given transmission power level, and after the 1xRTT network 206 discontinues the sequence of page messages and determines that the WCD 202 is no longer engaged in the active data communication, the 1xRTT network 206 may then begin transmitting a new sequence of page messages (e.g., reinitiate the sequence) at a transmission power level that is greater than the given transmission power level.

Other example scenarios are possible as well, including, but not limited to, variations of the example scenarios described above.

III. Example Operation

Figure 3:
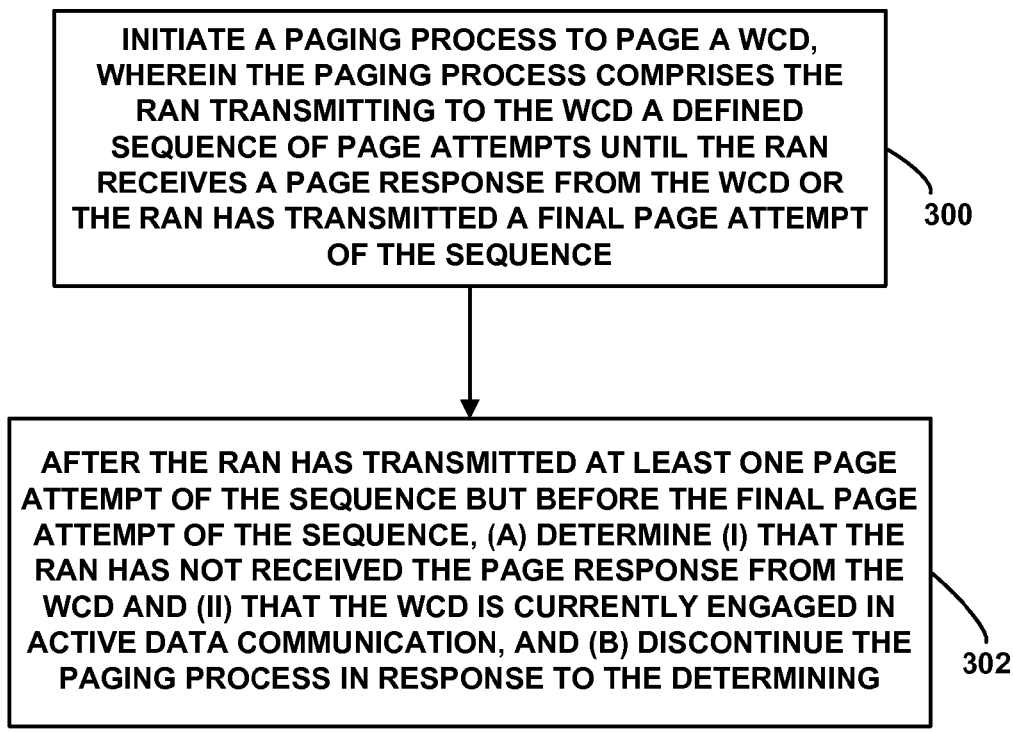
FIG. 3 is a flow chart depicting functions that can be carried out in accordance with the present method.

FIG. 3 is a flow chart depicting functions that can be carried out in accordance with the present method. For the sake of example, the present method will be assumed to be carried out with respect to the network arrangements illustrated in FIG. 1 and FIG. 2. It should be understood, however, that in other examples, the present method may also be carried out with respect to other network arrangements. In the examples described herein, the present method may be carried out by one or more of the RAN entities described above, such as a base station, base station controller, mobile switching center, mobility management entity, or gateway, or by other RAN entities not described above. Further, the present method may be carried out by a RAN entity in accordance with one or more WCDs (or other such devices) different than those described herein.

The present method may include one or more operations, functions, or actions as illustrated by one or more of blocks 300-302. Although the blocks are illustrated in a sequential order, the functions illustrated by the blocks may also be performed in parallel or in reverse order.

Referring to FIG. 3, at block 300, a RAN initiates a paging process to page a WCD, wherein the paging process comprises the RAN transmitting to the WCD a defined sequence of page attempts until the RAN receives a page response from the WCD or the RAN has transmitted a final page attempt of the sequence. The paging process may be carried out by the RAN as described above, or in another manner not described herein. At block 302, after the RAN has transmitted at least one page attempt of the sequence but before the RAN has transmitted the final page attempt of the sequence, the RAN determines (i) that the RAN has not received the page response from the WCD, and (ii) that the WCD is currently engaged in active data communication, and responsive to the determining, the RAN then discontinues the paging process. As noted above, the WCD being currently engaged in active data communication may comprise the WCD currently having an active wireless data connection and/or currently being engaged in a data communication session.

In line with the discussion above, in order for the RAN to determine that the WCD is engaged in active data communication, a voice call serving network of the RAN (e.g., the 1xRTT network 206) may engage in push and/or pull communications with a data serving network of the RAN (e.g., the 1xEV-DO network 204). For example, a DPI-enabled entity of the data serving network may indicate to the voice call serving network (via the voice call serving network querying the data serving network) that the WCD is currently sending and/or receiving session initiation messages to initiate a data communication session, and may also indicate that the WCD is currently sending and/or receiving packet data in the data communication session. As another example, the data serving network may push out to the voice call serving network a DDTM ON flag, an IP address of the WCD, a serial number of the WCD, or the like, indicative of the WCD currently having an active data connection and/or being currently engaged in an active data communication session. Other examples are also possible.

IV. Example Network Devices a. Example Wireless Communication System

Figure 4:
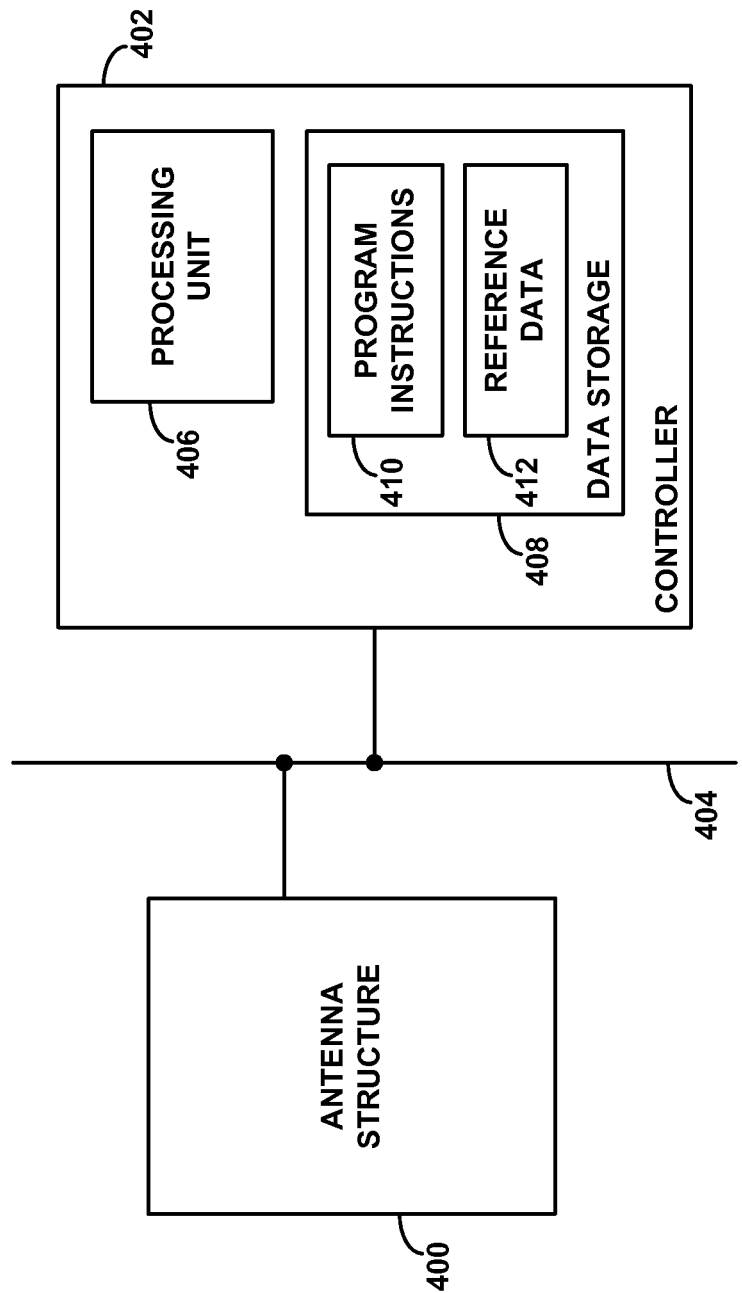
FIG. 4 is a simplified block diagram depicting components of an example wireless communication system arranged to implement aspects of the present method.

FIG. 4 is a simplified block diagram depicting components of an example wireless communication system arranged to implement aspects of the present method. As shown, the example system includes an antenna structure 400 and a controller 402, which may be coupled together by a system bus, network, or other connection mechanism 404. In an example implementation, the components of this system may be provided in one or more RAN entities, such as a BTS, access node, eNB, BSC, MSC, RNC, MME, or gateway, or the components may be distributed among various such RAN entities. Additionally or alternatively, the components may be provided in other entities in the wireless communication system.

The antenna structure 400 may comprise one or more antennas configured to radiate so as to define an air interface coverage area in which to serve one or more WCDs. In some implementations, the antenna structure 400 may be arranged to communicate over a given air interface with a base station, controller, gateway, and/or or other entities noted above. The controller 402 may comprise a processing unit 406 (e.g., one or more general purpose processors and/or one or more special purpose processors) and non-transitory data storage 408 (e.g., volatile and/or non-volatile storage such as magnetic, optical, or flash storage, possibly integrated in whole or in part with the processing unit 406).

As shown, the non-transitory data storage 408 may hold program instructions 410, which may be executable by the processing unit 406 to carry out various functions described herein. For instance, the functions may include initiating a paging process to page a WCD, determining that the system has not received a page response from the WCD, determining that the WCD is currently engaged in active data communication, and discontinuing the paging process. In some examples, the processing unit 406 and the non-transitory data storage 408 could be provided as any combination of hardware, firmware, and/or software.

Further, the non-transitory data storage 408 may hold reference data 412 for use in accordance with the present method, such as a DDTM ON flag associated with a particular WCD, an identifier of the particular WCD (e.g., a serial number or IP address), or another indicator that the particular WCD may be currently engaged in active data communication.

b. Example WCD

Figure 5:
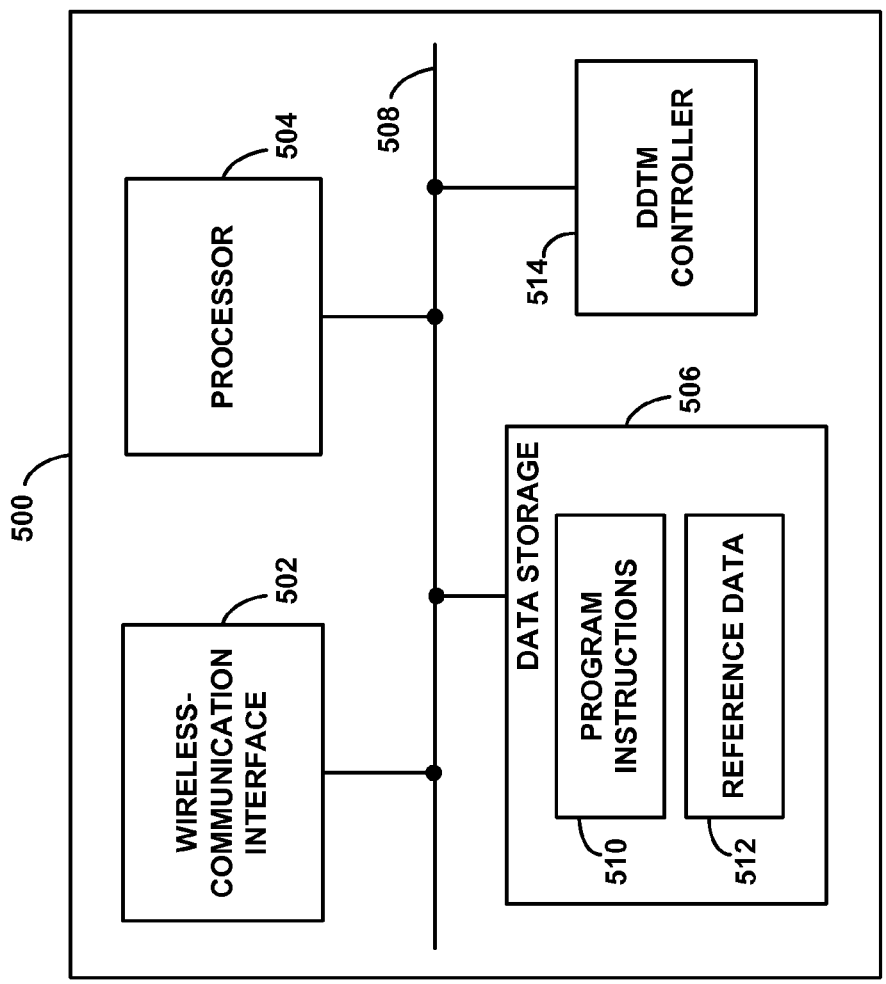
FIG. 5 is a simplified block diagram of an example wireless communication device arranged to implement aspects of the present method.

FIG. 5 is a simplified block diagram of an example WCD 500 arranged to operate in an example RAN in accordance with the present method. As shown in FIG. 5, the example WCD 500 includes a wireless communication interface 502, a processor 504, and non-transitory data storage 506, all of which may be communicatively linked together by a system bus, network, or other connection mechanism 508. Variations from this arrangement are of course possible as well, including addition and omission of components, combination of components, and distribution of components in any of a variety of ways.

In the arrangement shown, wireless communication interface 502 may function to engage in air interface communication with one or more RANs, such as the 1xEV-DO network 204 (e.g., via access node 212) and the 1xRTT network 206 (e.g., via BTS 220) shown in FIG. 2. As such, the wireless communication interface 502 may include an antenna structure and a chipset arranged to support air interface communication (e.g., CDMA communication) with the 1xEV-DO network 204 and the 1xRTT network 206. The wireless communication interface 502 may be arranged to support other air interface communication (e.g., GSM and LTE) with other networks as well. In practice, the WCD 500 (e.g., the wireless communication interface) may be arranged to engage in active data communication with a packet-switched network via a RAN (e.g., the 1xEV-DO network 204). The WCD 500 may further be arranged to receive page messages from (and send page responses to) another RAN (e.g., the 1xRTT network 206).

The processor 504 may comprise one or more general purpose processors (e.g., microprocessors) and/or one or more special purpose processors (e.g., application specific integrated circuits or the like) and may be integrated in whole or in part with wireless communication interface 502. The non-transitory data storage 506 may then comprise one or more volatile and/or non-volatile storage components, particularly non-transitory storage, such as magnetic, optical, or flash memory for instance, and may be integrated in whole or in part with the processor 504. Additionally or alternatively, the non-transitory data storage 506 may be provided separately, as a non-transitory machine readable medium.

As shown, the non-transitory data storage 506 may hold (e.g., contain, store, or be encoded with) program instructions 510 (e.g., machine language instructions or other program logic, markup or the like) executable by the processor to carry out various functions described herein. The non-transitory data storage 506 may also hold reference data 512 for use in accordance with the present method, such as one or more stored identifiers of the WCD 500 (e.g., a serial number or IP address of the WCD).

The example WCD 500 may also include a DDTM controller 514 configured to switch DDTM "ON" or "OFF" based on whether the WCD 500 is engaged in data communication, and possibly further based on a type of data communication session that the WCD 500 is engaged in (VoIP call, web browsing session, etc.). The DDTM controller 514 may be configured to perform other functions as well.

While various aspects have been disclosed herein, other aspects will be apparent to those skilled in the art. The various aspects disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

What is claimed is:

1. In a radio access network (RAN) that provides wireless communication service to at least one wireless communication device (WCD), a method comprising:

the RAN initiating a paging process to page a WCD over at least one air interface, wherein the paging process comprises the RAN transmitting over the at least one air interface for receipt by the WCD a defined sequence of page messages until the RAN receives a page response from the WCD or the RAN has transmitted a final page message of the sequence; and after the RAN has transmitted at least one page message of the sequence over the at least one air interface for receipt by the WCD but before the RAN has transmitted the final page message of the sequence over the at least one air interface for receipt by the WCD, (a) the RAN determining (i) that the RAN has not received the page response from the WCD and (ii) that the WCD is currently engaged in active data communication, and (b) responsive to the determining, the RAN discontinuing the paging process, wherein the RAN determining that the RAN has not received the page response from the WCD comprises at least one operation selected from the group consisting of (1) the RAN determining that the RAN has not received the page response from the WCD within a threshold period of time since the RAN initiated the paging process and (2) the RAN determining that the RAN has transmitted a threshold number of the page messages over the at least one air interface for receipt by the WCD without yet receiving the page response from the WCD.

2. The method of claim 1, wherein determining that the WCD is engaged in active data communication comprises determining that the WCD has an active wireless data connection.

3. The method of claim 2, wherein the voice call is to be connected to the WCD over a first air interface protocol, and wherein the active wireless data connection is over a second air interface protocol.

4. The method of claim 3, wherein the first air interface protocol is a Code Division Multiple Access (CDMA) air interface protocol, and the second air interface protocol is selected from the group consisting of a Long-Term Evolution (LTE) air interface protocol and the CDMA air interface protocol.

5. The method of claim 2, wherein determining that the WCD has the active wireless data connection comprises querying a network serving node to determine whether the WCD has the active wireless data connection.

6. The method of claim 1, further comprising:

after the discontinuing of the paging process, the RAN determining that the WCD is no longer engaged in active data communication; and responsive to the determining that the WCD is no longer engaged in active data communication, the RAN reinitiating the paging process to page the WCD over the at least one air interface.

7. The method of claim 6, wherein the paging process comprises the RAN transmitting over the at least one air interface for receipt by the WCD the defined sequence of page messages at a given transmission power level, wherein the RAN reinitiating the paging process to page the WCD over the at least one air interface comprises the RAN transmitting over the at least one air interface for receipt by the WCD a new sequence of page messages at a transmission power level greater than the given transmission power level.

8. The method of claim 1, wherein the RAN discontinuing the paging process comprises the RAN pausing the paging process for a predetermined duration of time longer than the RAN would normally wait between transmission of page messages of the sequence.

9. The method of claim 1, carried out by one or more RAN entities each selected from the group consisting of a base station, a base station controller, a mobile switching center, a mobility management entity, and a gateway.

10. The method of claim 1, wherein transmitting over the at least one air interface for receipt by the WCD the defined sequence of page messages comprises transmitting over at least one air interface for receipt by the WCD in accordance with an air interface protocol selected from the group consisting of Long-Term Evolution (LTE), Code Division Multiple Access (CDMA), and Global System for Mobile Communications (GSM).

11. A non-transitory computer-readable medium having stored thereon program instructions executable by a processing unit of a radio access network (RAN) to cause the RAN to perform functions comprising:
  initiating a paging process to page a WCD over at least one air interface, wherein the paging process comprises the RAN transmitting over the at least one air interface for receipt by the WCD a defined sequence of page messages until the RAN receives a page response from the WCD or the RAN has transmitted a final page message of the sequence; and
  after the RAN has transmitted at least one page message of the sequence over the at least one air interface for receipt by the WCD but before the RAN has transmitted the final page message of the sequence over the at least one air interface for receipt by the WCD, (a) determining (i) that the RAN has not received the page response from the WCD and (ii) that the WCD is currently engaged in active data communication, and (b) responsive to the determining, the RAN discontinuing the paging process,
  wherein determining that the RAN has not received the page response from the WCD comprises at least one operation selected from the group consisting of (1) determining that the RAN has not received the page response from the WCD within a threshold period of time since the paging process was initiated and (2) determining that a threshold number of the page messages have been transmitted over the at least one air interface for receipt by the WCD without the RAN yet receiving the page response from the WCD.

12. The non-transitory computer-readable medium of claim 11, wherein determining that the WCD is currently engaged in the active data communication comprises:
  responsive to determining that the RAN has not received the page response from the WCD, determining whether the WCD is currently engaged in the active data communication.

13. The non-transitory computer-readable medium of claim 11, wherein determining that the WCD is engaged in active data communication comprises determining that the WCD has an active wireless data connection over a second air interface protocol.

14. The non-transitory computer-readable medium of claim 13, wherein determining that the WCD has the active wireless data connection over the second air interface protocol comprises querying a network serving node to determine whether the WCD has the active wireless data connection over the second air interface protocol.

15. A radio access network (RAN) that provides wireless communication service to wireless communication devices (WCDs), the RAN comprising:
  at least one wireless communication interface;
  at least one processor;
  data storage; and
  program instructions stored in the data storage, wherein the program instructions are executable by the at least one processor to perform functions, the functions comprising:
    initiating a paging process to page a WCD over at least one air interface, wherein the paging process comprises transmitting over the at least one air interface for receipt by the WCD a defined sequence of page messages until the RAN receives a page response from the WCD or the RAN has transmitted a final page message of the sequence; and
    after transmitting at least one page message of the sequence over the at least one air interface for receipt by the WCD but before transmitting the final page message of the sequence over the at least one air interface for receipt by the WCD, (a) determining (i) that the RAN has not received the page response from the WCD and (ii) that the WCD is currently has a wireless data connection, and (b) responsive to the determining, discontinuing the paging process,
    wherein determining that the RAN has not received the page response from the WCD comprises at least one operation selected from the group consisting of (1) determining that the RAN has not received the page response from the WCD within a threshold period of time since the paging process was initiated and (2) determining that a threshold number of the page messages have been transmitted over the at least one air interface for receipt by the WCD without the RAN yet receiving the page response from the WCD.

16. The RAN of claim 15, wherein the RAN comprises at least one entity selected from the group consisting of a base station, a base station controller, a mobile switching center, a mobility management entity, and a gateway, wherein the at least one entity includes the at least one processor.

17. The RAN of claim 15, the functions further comprising:
  after the discontinuing of the paging process, determining that the WCD no longer has the wireless data connection; and
  responsive to the determining that the WCD no longer has the wireless data connection, reinitiating the paging process to page the WCD over the at least one air interface.

* * * * *